(12) United States Patent
Nomura et al.

(10) Patent No.: US 9,411,195 B2
(45) Date of Patent: Aug. 9, 2016

(54) LIQUID CRYSTAL DISPLAY APPARATUS

(71) Applicant: STANLEY ELECTRIC CO., LTD., Meguro-ku, Tokyo (JP)

(72) Inventors: Yasuhiro Nomura, Tokyo (JP); Yoshihisa Iwamoto, Tokyo (JP)

(73) Assignee: STANLEY ELECTRIC CO., LTD., Tokyo (JP)

( * ) Notice: Subject to any disclaimer, the term of this patent is extended or adjusted under 35 U.S.C. 154(b) by 78 days.

(21) Appl. No.: 14/179,322

(22) Filed: Feb. 12, 2014

(65) Prior Publication Data

US 2014/0226117 A1    Aug. 14, 2014

(30) Foreign Application Priority Data

Feb. 14, 2013 (JP) .................................. 2013-027090

(51) Int. Cl.
 *G02F 1/1343* (2006.01)
 *G02F 1/1337* (2006.01)

(52) U.S. Cl.
 CPC .... *G02F 1/133753* (2013.01); *G02F 1/134309* (2013.01); *G02F 1/134327* (2013.01); *G02F 2001/133742* (2013.01); *G02F 2001/134318* (2013.01)

(58) Field of Classification Search
 CPC .................................................. G09G 3/3622
 See application file for complete search history.

(56) References Cited

U.S. PATENT DOCUMENTS

| 2012/0069278 A1 | 3/2012 | Iwamoto |
| 2012/0105786 A1* | 5/2012 | Iwamoto et al. ............... 349/139 |
| 2012/0218500 A1 | 8/2012 | Nakamura et al. |
| 2013/0021569 A1 | 1/2013 | Iwamoto et al. |

FOREIGN PATENT DOCUMENTS

| EP | 2549326 A1 | 1/2013 |
| JP | 06-27907 | 2/1994 |
| JP | 11174481 A | 7/1999 |
| JP | 2012-093578 | 5/2012 |

OTHER PUBLICATIONS

European Search Report dated Apr. 30, 2014 in counterpart European Application No. 14020012.2.

* cited by examiner

*Primary Examiner* — Nathanael R Briggs
*Assistant Examiner* — Alexander Gross
(74) *Attorney, Agent, or Firm* — Holtz, Holtz & Volek PC

(57) ABSTRACT

To increase production efficiency while retaining the display quality of a liquid crystal display apparatus. The apparatus comprises a first substrate, a second substrate, a first electrode on the first substrate extending in a first direction, a second electrode on the second substrate extending in a second direction which intersects to the first direction, a liquid crystal layer provided between the two substrates. A pixel is configured where the two electrodes intersect and an orientation process is performed perpendicular to the second direction on one of the substrates. The electrode edge shape of the second electrode includes lines that are obliquely crossed relative to the direction of orientation process and periodically bend back. The pixel edges of the pixel are demarcated including the lines obliquely crossed, and all change points where the lines of the electrode edge of the second electrode interconnects are disposed to superimpose with the first electrode.

4 Claims, 5 Drawing Sheets

LIQUID CRYSTAL DISPLAY APPARATUS

BACKGROUND OF THE INVENTION

1. Field of the Invention

The present invention relates to a vertical alignment liquid crystal display apparatus which is driven by multiplex driving.

2. Description of the Background Art

A liquid crystal display apparatus is broadly used as an information display unit in various electronic devices for consumer or automobile use. In General, a liquid crystal display apparatus is configured by disposing a liquid crystal layer made of a liquid crystal material between two substrates that are placed opposite each other with a gap of roughly several micrometers. As one type of this kind of liquid crystal display apparatus, a vertical alignment liquid crystal display apparatus is known. For example, Japanese Patent Laid-Open No. 2012-93578 according to a patent application by the applicant of this application discloses a liquid crystal display apparatus configured so that the pixel edges of the respective pixels include line segments that are obliquely crossed relative to the direction of the orientation process. According to this precedent, it is possible to obtain a liquid crystal display apparatus that homogenizes the light leakage near the edges of the respective pixels when the apparatus is observed from an anti-viewing direction, and thus improves the display quality. Further, it has also been verified that the liquid crystal display apparatus of this precedent is capable of homogenizing the light leakage even in a case where the ambient temperature becomes relatively high, thereby maintaining the display quality. Furthermore, in the liquid crystal display apparatus of the precedent, it is only necessary to form at least one of the electrode edges of the electrodes respectively provided to the upper and lower substrates into a periodically bending shape, thereby resulting in the additional advantage of making it possible to align the direction of the orientation process to the up-down direction or left-right direction of the liquid crystal display apparatus, which is the generally preferred direction.

The liquid crystal display apparatus of the precedent described above forms the electrode edges in the planar view of the respective electrodes of one substrate into periodically bending shapes, and forms the respective electrodes of the other substrate into stripe shapes in the planar view, establishing each location where both electrodes overlap as a pixel. Specifically, the respective electrodes of one substrate of the liquid crystal display apparatus of the precedent are disposed so that the bending apex portions of these electrode edges overlap with the gaps between the respective electrodes of the other substrate. As a result, the bending apex portion is disposed between two adjacent pixels.

Nevertheless, in a case where a configuration wherein the bending apex portion is disposed between two adjacent pixels is adopted, high accuracy is required in the alignment process of the two substrates, resulting in the disadvantage of causing a decrease in yield as well as a decrease in production efficiency. This disadvantage becomes quite significant in a case where an attempt is made to increase the aperture ratio by further decreasing the distance between the electrodes.

SUMMARY OF THE INVENTION

An object of a specific mode of the present invention which relates to a vertical alignment liquid crystal display apparatus driven by multiplex driving, is to increase the yield and production efficiency while maintaining the effectiveness of improving the display quality.

The liquid crystal display apparatus according to a specific mode of the present invention comprises (a) a first substrate and a second substrate placed opposite each other, (b) a first electrode provided on one surface of the first substrate and which extends in a first direction, (c) a second electrode provided on one surface of the second substrate and which extends in a second direction that intersects to the first direction, and (d) a mono-domain vertical alignment type liquid crystal layer with a pretilt angle of less than 90°, provided between one surface of the first substrate and one surface of the second substrate, (e) wherein a pixel is configured in a region where the first electrode and the second electrode intersect, (f) an orientation process is performed in a direction perpendicular to the second direction on at least one of the first substrate and the second substrate, (g) an electrode edge of at least one side of the second electrode is of a shape that includes lines or curves that are obliquely crossed relative to the first direction and periodically bend back, (h) the pixel edges of the pixel are demarcated, including the lines or curves that are obliquely crossed, and (i) all change points where a plurality of the lines or curves of the electrode edge of the second electrode interconnects are disposed so that they are superimposed in the planar view with the first electrode.

According to the foregoing configuration, since the pixel edges are demarcated on including the line segments that are obliquely crossed relative to the direction of the alignment treatment, it is possible to homogenize the light leakage near the edges of the respective pixels on observing the liquid crystal display apparatus from an anti-viewing direction, and improve the display quality. Further, the change point of the electrode edge of the second electrode (for example, the bending point where the lines connect) is set to a position that is superimposed with the first electrode, thereby eliminating the need for high accuracy in the alignment of the first substrate and the second substrate and making it possible to improve the yield as well as production efficiency.

In the above described liquid crystal display apparatus, the change point is preferably disposed at the center between the electrode edges of both sides of the first electrode, for example. The term "center" here refers to an intermediate point between the first element and the second element, permitting a range of ±5% with respect to the intermediate point taking into consideration the manufacturing tolerance.

As a result, a pixel edge of a horizontally or vertically symmetrical shape is obtained.

In the above described liquid crystal display apparatus, the change point is preferably disposed so that it is biased toward the side near the electrode edge of either one side of the first electrode, for example.

As a result, the margin of the alignment of the first substrate and the second substrate is further increased. Further, an effect of further homogenizing the orientation state of the liquid crystal layer is achieved.

In the above described liquid crystal display apparatus, the obliquely crossing lines are preferably disposed at an angle greater than 0° and less than or equal to 15° using the second direction as standard.

As a result, it is possible to visually recognize the shape of the pixel edge as close to that of a rectangle.

DESCRIPTION OF THE PREFERRED EMBODIMENTS

Figure 1:
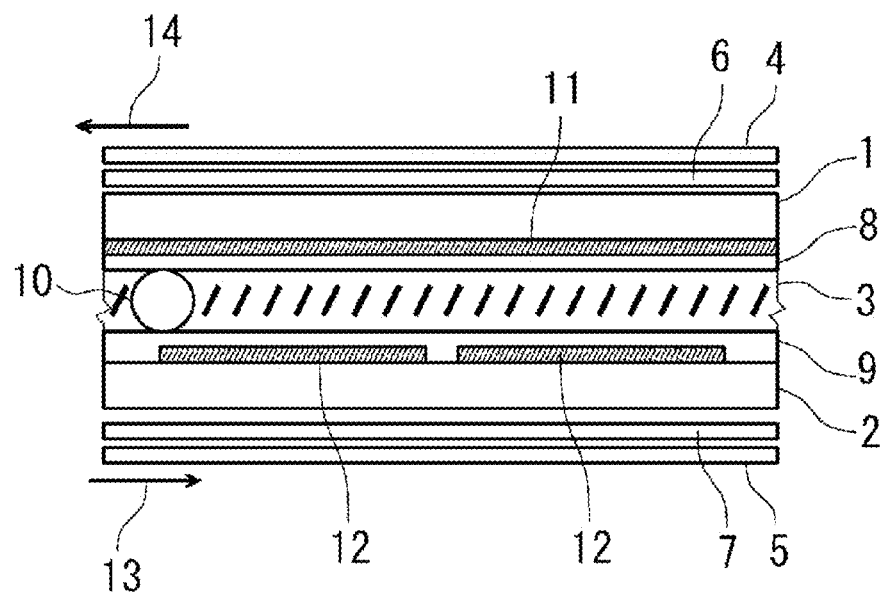
FIG. 1 is a schematic cross section showing the structure of the liquid crystal display apparatus according to one embodiment of the present invention.

FIG. 1 is a schematic cross section showing the structure of the liquid crystal display apparatus according to one embodiment of the present invention. The liquid crystal display apparatus of this embodiment shown in FIG. 1 mainly comprises a first substrate 1 and a second substrate 2 placed opposite each other and a liquid crystal layer 3 provided between both substrates. A first polarizer 4 is disposed outside the first substrate 1, and a second polarizer 5 is disposed outside the second substrate 2. A first viewing angle compensator 6 is disposed between the first substrate 1 and the first polarizer 4, and a second viewing angle compensator 7 is disposed between the second substrate 2 and the second polarizer 5. The periphery of the liquid crystal layer 3 is sealed with a sealant. The structure of the liquid crystal display apparatus is now explained in further detail. In this specification, the expression "perpendicular to" refers to a first element and a second element intersecting at a right angle (90°), permitting an angle of 90°±5° taking into consideration the manufacturing tolerance. The expression "parallel to" refers to a first element and a second element being parallel to each other (0°), permitting an angle of 0°±5° taking into consideration the manufacturing tolerance. The expression "vertical alignment" refers to an alignment comprising a pretilt angle of a size less than 90° but yet considerably large (greater than or equal to 87° and less than 90°, for example). The expression "obliquely crossed" refers to the oblique crossing at an angle other than perpendicular.

The first substrate 1 and the second substrate 2 are respectively, for example, transparent substrates such as glass substrates or plastic substrates. Spacers (sphere materials) 10 are dispersed and disposed between the first substrate 1 and the second substrate 2. As a result of these spacers 10, the gap between the first substrate 1 and the second substrate 2 is maintained at a predetermined distance (in this embodiment, approximately 4.9 micrometers).

The liquid crystal layer 3 is provided mutually between the first electrode 11 of the first substrate 1 and the second electrode 12 of the second substrate 2. In this embodiment, the liquid crystal layer 3 is configured by using a liquid crystal material (nematic liquid crystal material) in which the dielectric anisotropy $\Delta\varepsilon$ (delta epsilon) is negative ($\Delta\varepsilon<0$). Bold lines illustrated in the liquid crystal layer 3 schematically show the director of the liquid crystal molecules during the non-application of voltage. As shown in the diagram, with the liquid crystal display apparatus of this embodiment, the alignment state of the liquid crystal molecules in the liquid crystal layer 3 is oriented by a mono-domain alignment. The pretilt angle of the liquid crystal layer 3 in this embodiment is substantially set to 89.85°. And the refractive index anisotropy $\Delta n$ (delta n) of the liquid crystal layer 3 is set to 0.18.

The polarizer 4 and the polarizer 5 are disposed so that their respective absorption axes are mutually perpendicular (crossed Nicol alignment). Moreover, the polarizer 4 and the polarizer 5 are disposed so that their respective absorption axes form an angle of substantially 45° (degrees) with both the direction 14 of the alignment treatment performed to the first substrate and the direction 13 of the alignment treatment performed to the second substrate. Consequently, the absorption axes of the respective polarizers 4, 5 form an angle of substantially 45° (degrees) relative to the alignment direction of the liquid crystal layer at the substantial center of the liquid crystal layer 3 that is defined by the directions 13, 14 of the respective alignment treatments.

An alignment film 8 is provided to one surface side of the first substrate 1 so as to cover the first electrode 11. Similarly, an alignment film 9 is provided to one surface side of the second substrate 2 so as to cover the second electrode 12. Alignment treatment such as rubbing treatment is performed on the surface of the respective alignment films 8,9. The direction 14 of the alignment treatment performed to the alignment film 8 is as shown in the diagram, and roughly coincides with the extending direction (first direction) of the first electrode 11. Moreover, the direction 13 of the alignment treatment performed to the alignment film 9 is as shown in the diagram, and is substantially perpendicular to the extending direction (second direction) of the second electrode 12. In this embodiment, as the alignment film 8 and the alignment film 9, used is a film (vertical alignment film) for controlling the alignment state of the liquid crystal layer 3 in its initial state (during non-application of voltage) to a vertically aligned state. More specifically, as the respective alignment films 8, 9, used is a film that is capable of forming a pretilt angle that is extremely close to 90° (degrees) but smaller than 90° relative to the liquid crystal molecules of the liquid crystal layer 3.

The first electrode 11 is provided to one surface side of the first substrate 1. Similarly, the second electrode 12 is provided to one surface side of the second substrate 2. In this embodiment, a plurality of first electrodes 11 and a plurality of second electrodes 12 respectively extending in specific directions are placed opposite each other by causing their respective extending directions to be perpendicular. The first electrode 11 and the second electrode 12 is configured respectively, for example, by patterning a transparent conductive film made of indium tin oxide (ITO) or the like as needed. With the liquid crystal display apparatus of this embodiment, the respective overlapping portions of the first electrode 11 and the second electrode 12 in a planar view become the pixel.

In this embodiment, by causing the electrode edge of the respective second electrodes 12 to be a broken curve shape (a shape with repeated inflection) including a line segment which obliquely crosses the extending direction (first direction) of each of the stripe-shaped first electrode, a structure is achieved where the pixel edge of the portion that is demarcated by the electrode edge of the respective second electrodes 12 among the respective pixels and the directions 13, 14 of the respective alignment treatment are not perpendicular. Some specific structures are described below.

Figure 2:
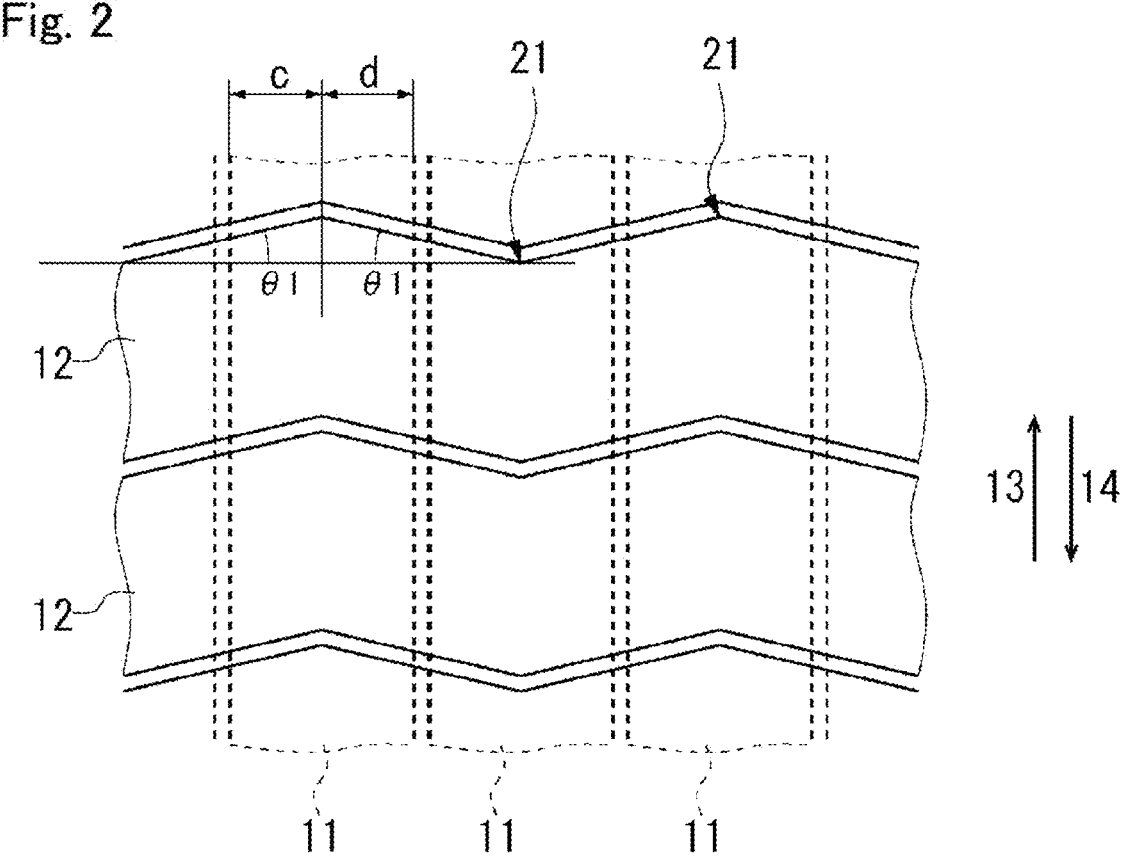
FIG. 2 is a schematic plan view showing an example of the electrode structure.

FIG. 2 is a schematic plan view showing an example of the electrode structure. FIG. 2 shows a planer view of the first electrodes 11 and the second electrodes 12 viewed from the second substrate 2 side. As shown in FIG. 2, the electrode edge of the respective second electrodes 12 extending in the longitudinal direction in the diagram is formed in a saw teeth shape, and one pitch of the saw teeth basically coincides with the electrode width of the respective first electrodes 11. Also, as shown in FIG. 2, the respective second electrodes 12 are disposed in a state in which the bending points (apex angle portions) 21, which are the change points where the lines interconnect, overlap with the center portion in the width direction of the first electrode 11. In this example, the respective bending points 21 of the one electrode edge and the other electrode edge of the respective second electrodes 12 are in positions that result in the bending points 21 that overlap with the one first electrode 11 being substantially in alignment in the up-down direction in the diagram, and the bending points 21 in these aligned positions are disposed upwardly convex or downwardly concave in alignment.

Hence, since each of the regions where the respective first electrodes 11 and the respective second electrodes 12 intersect constitutes one pixel, the outer edge shape (planar view shape) of the respective pixels forms a hexagon with a V shape or inverted V shape demarcated by electrode edges of the first electrode 11 and electrode edges of the second electrode 12, each surface area thereof being substantially equal. Specifically, a V-shaped pixel and an inverted V-shaped pixel are alternately arranged in the left-right direction, and a V-shaped or inverted V-shaped pixel is sequentially arranged in the up-down direction.

In FIG. 2, when the angle formed by the electrode edge of the saw teeth-shaped second electrode 12 and the horizontal direction (longitudinal direction in the diagram) is defined as θ1 (theta one), this angle θ1 is set to be from greater than 0° to 15° or below. With this arrangement, a structure in which the pixel edges of the sections demarcated by the electrode edges of the respective second electrodes 12 of the respective pixels and directions 13, 14 of the respective orientation processes do not perpendicularly intersect is realized. Hence, the reason the angle is set to less than or equal to 15° is that, under such conditions, the bent state of the pixel edge is not readily visually recognizable and thus an appearance that is not inferior to that of a rectangular-shaped pixel is achieved (hereinafter the same). Further, all of the bending points 21 of the respective second electrodes 12 are disposed overlapping with the center portion (the center between the electrode edges of both sides of the first electrode) in the width direction of the first electrode 11, thereby never resulting in the occurrence of extreme deformation in the pixel shape, even if some displacement occurs when the first substrate 1 and the second substrate 2 are superimposed, and thus achieving a stable display state with favorable yield.

Figure 3:
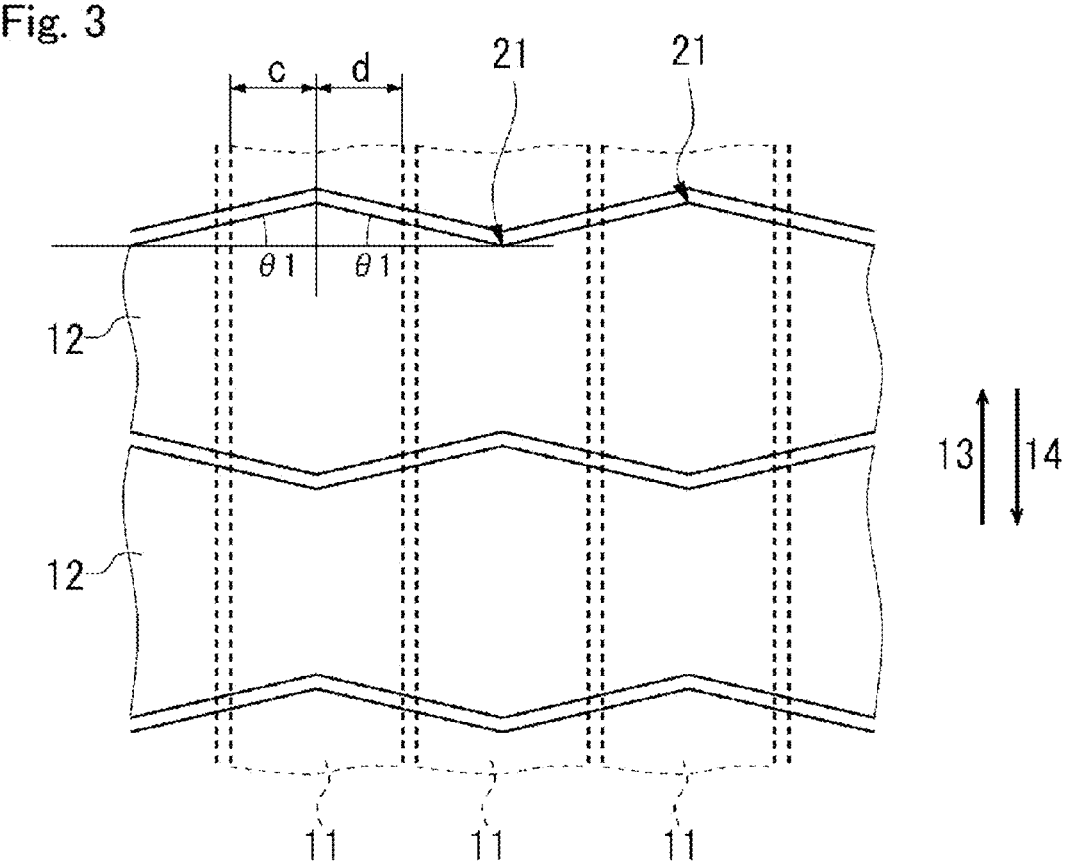
FIG. 3 is a schematic plan view showing other example of the electrode structure.

FIG. 3 is a schematic plan view showing other example of the electrode structure. As shown in FIG. 3, the electrode edge of the respective second electrodes 12 extending in the longitudinal direction in the diagram is formed in a saw teeth shape, and one pitch of the saw teeth basically coincides with the electrode width of the respective first electrodes 11. Also, as shown in FIG. 3, the respective second electrodes 12 are disposed in a state in which the bending points (apex angle portions) 21, which are the change points where the lines interconnect, overlap with the center portion in the width direction of the first electrode 11. In this example, the respective bending points 21 of the one electrode edge and the other electrode edge of the respective second electrodes 12 are in positions that result in the bending points 21 that overlap with the one first electrode 11 being substantially in alignment in the up-down direction in the diagram. The bending points 21 in these aligned positions are disposed so as to form either a combination wherein one is upwardly convex while the other is downwardly convex (a combination where the distance between the bending points 21 is relatively large), or a combination wherein one is downwardly convex while the other is upwardly convex (a combination where the distance between the bending points 21 is relatively small).

Hence, since each of the regions where the respective first electrodes 11 and the respective second electrodes 12 intersect constitutes one pixel, the outer edge shape (planar view shape) of the respective pixels is demarcated by electrode edges of the first electrode 11 and electrode edges of the second electrode 12. And the shape of the pixel is a hexagon, the surface area of which differs for two pixels adjacent in the up-down direction or left-right direction.

In FIG. 3, when the angle formed by the electrode edge of the saw teeth-shaped second electrode 12 and the horizontal direction (longitudinal direction in the diagram) is defined as θ1, this angle θ1 is set to be from greater than 0° to 15° or below. With this arrangement, a structure in which the pixel edges of the sections demarcated by the electrode edges of the respective second electrodes 12 of the respective pixels and directions 13, 14 of the respective orientation processes do not perpendicularly intersect is realized. Further, all of the bending points 21 of the respective second electrodes 12 are disposed overlapping with the center portion (the center between the electrode edges of both sides of the first electrode) in the width direction of the first electrode 11, thereby never resulting in the occurrence of extreme deformation in the pixel shape, even if some displacement occurs when the first substrate 1 and the second substrate 2 are superimposed, and thus achieving a stable display state with favorable yield. Note that, in comparison to the pixel structure shown in FIG. 2, the pixel structure shown in FIG. 3 produces a difference in surface area of the respective pixels, and thus the pixel structure shown in FIG. 2 is preferred. However, in a case where the pixel size is relatively small, the difference in surface area of the adjacent pixels decreases, resulting in no objection to such a pixel structure in terms of practical use.

Figure 4:
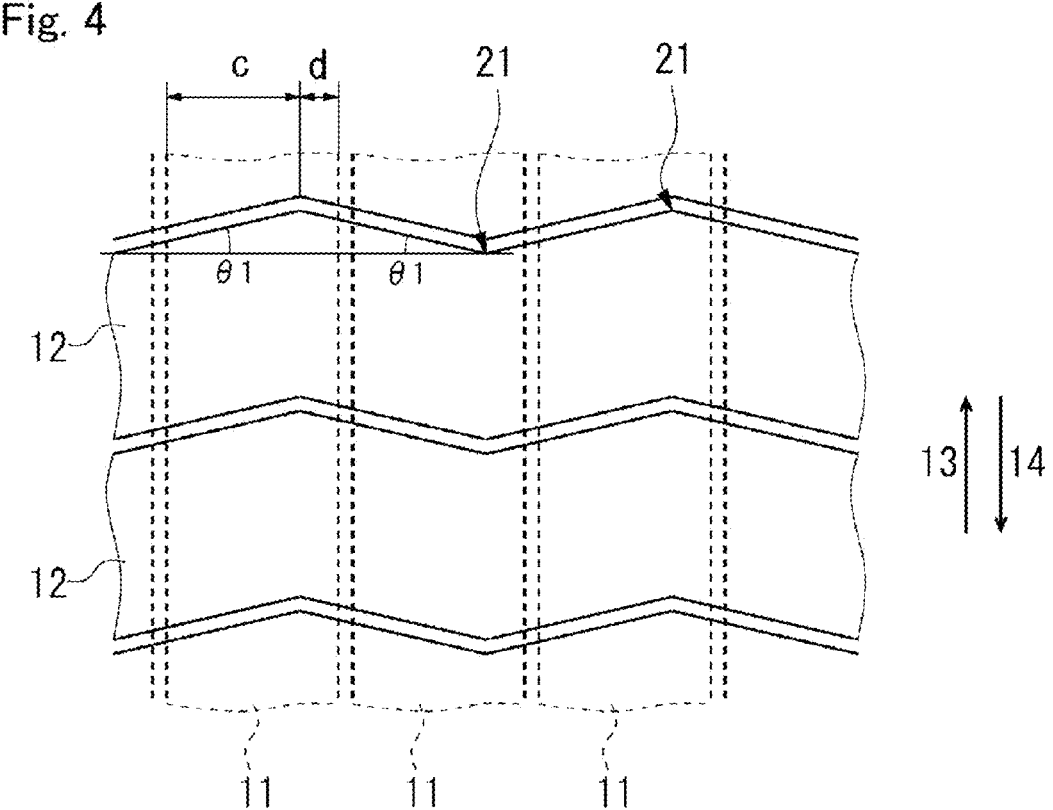
FIG. 4 is a schematic plan view showing other example of the electrode structure.

FIG. 4 is a schematic plan view showing other example of the electrode structure. As shown in FIG. 4, the electrode edge of the respective second electrodes 12 extending in the longitudinal direction in the diagram is formed in a saw teeth shape, and one pitch of the saw teeth basically coincides with the electrode width of the respective first electrodes 11. Further, as shown in FIG. 4, the respective second electrodes 12 are disposed with the bending point (apex angle portion) 21, which is the change point where the lines interconnect, overlapping with the first electrode 11 at a position biased toward the side near the left or right electrode edge (the electrode edge on the right side in the example shown) from the center portion in the width direction of the first electrode 11. In this example, the respective bending points 21 of the one electrode edge and the other electrode edge of the respective second electrodes 12 are in positions that result in the bending points 21 that overlap with the one first electrode 11 being substantially in alignment in the up-down direction in the diagram. Further, the bending points 21 in these aligned positions are disposed so as to form either a combination in which both are upwardly convex or a combination in which both are downwardly convex.

Hence, since each of the regions where the respective first electrodes 11 and the respective second electrodes 12 intersect constitutes one pixel, the outer edge shape (planar view shape) of the respective pixels is demarcated by electrode edges of the first electrode 11 and electrode edges of the second electrode 12. And the shape of the pixel is a hexagon, the surface area of which coincides between the two pixels adjacent in the up-down direction or left-right direction. Further, the pixels adjacent in the up-down direction are of the same shape, and the pixels adjacent in the left-right direction are of the same shape while differing in orientation.

Also, in FIG. 4, when the angle formed by the electrode edge of the saw teeth-shaped second electrode 12 and the horizontal direction (longitudinal direction in the diagram) is defined as θ1, this angle θ1 is set to be from greater than 0° to 15° or below. With this arrangement, a structure in which the pixel edges of the sections demarcated by the electrode edges of the respective second electrodes 12 of the respective pixels and directions 13, 14 of the respective orientation processes do not perpendicularly intersect is realized. Further, all of the bending points 21 of the respective second electrodes 12 are disposed overlapping while offset to the left or right from the center portion in the width direction of the first electrode 11, thereby making it possible to further homogenize the orientation state of the liquid crystal layer compared to the electrode structures shown in FIG. 2 and FIG. 3 described above, that is, compared to a case where the respective bending points 21 are disposed overlapping at the center portion. Specifically, with regard to the electrode edges of the respective pixels, given length components c, d parallel to the left-right direction as shown in the diagram, the total length of c and d and the electrode widths of the respective first electrodes 11 are set substantially equal. At this time, the respective bending portions 21 are disposed on the right side as viewed from the center of the pixels in the diagram in a case where the relationship is set to c>d, and on the left side as viewed from the center of the pixels in the diagram in a case where the relationship is set to c<d. For example, in a case where the relationship is set to c>d, c is preferably set within the range of 1.5-5, that is, c:d is preferably set to 1.5-5:1 when d is set to 1 (in the case of c<d, the relationship becomes the reverse).

Figure 5:
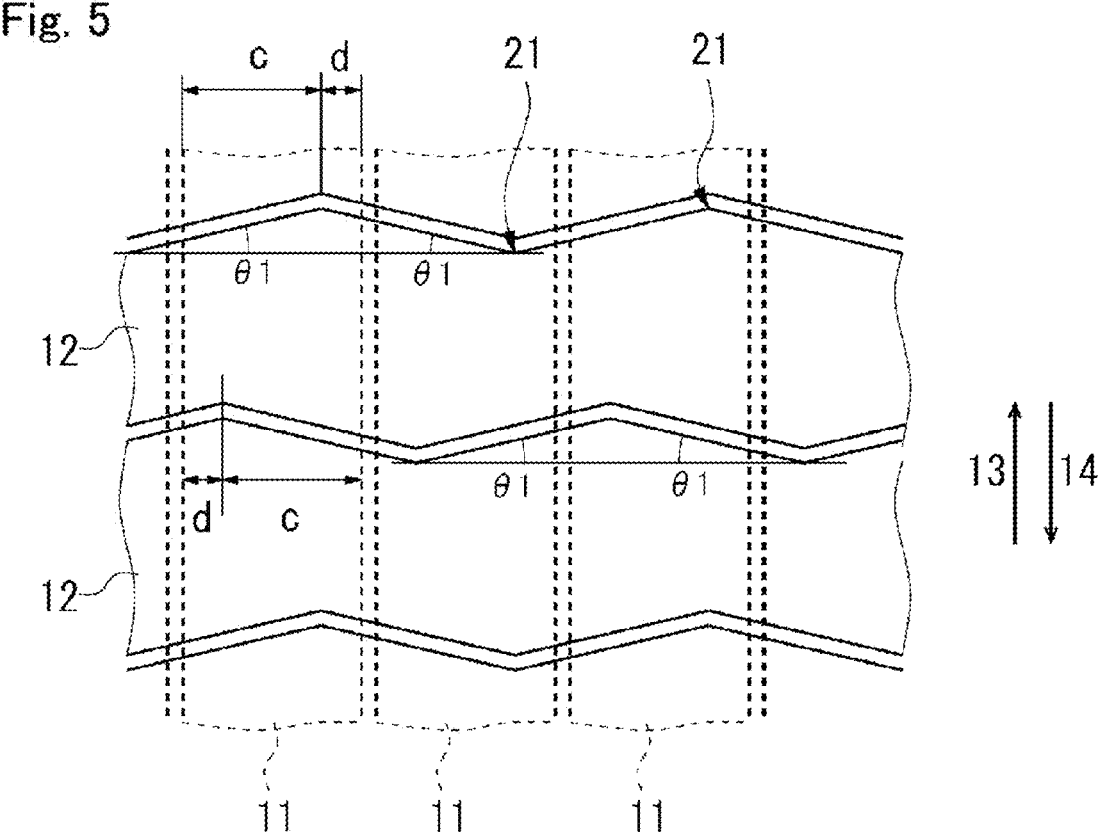
FIG. 5 is a schematic plan view showing other example of the electrode structure.

FIG. 5 is a schematic plan view showing other example of the electrode structure. As shown in FIG. 5, the electrode edge of the respective second electrodes 12 extending in the longitudinal direction in the diagram is formed in a saw teeth shape, and one pitch of the saw teeth basically coincides with the electrode width of the respective first electrodes 11. Further, as shown in FIG. 5, the respective second electrodes 12 are disposed with the bending point (apex angle portion) 21, which is the change point where the lines interconnect, overlapping with the first electrode 11 at a position biased toward the side near the left or right electrode edge from the center portion in the width direction of the first electrode 11. In this example, with regard to the respective bending points 21 of one electrode edge and the other electrode edge of the respective second electrodes 12, the respective bending points 21 that overlap with the one first electrode 11 are in different positions in the up-down direction in the diagram. Further, the bending points 21 in these different positions are disposed so as to form either a combination in which both are upwardly convex or a combination in which both are downwardly convex.

Hence, since each of the regions where the respective first electrodes 11 and the respective second electrodes 12 intersect constitutes one pixel, the outer edge shape (planar view shape) of the respective pixels is demarcated by electrode edges of the first electrode 11 and electrode edges of the second electrode 12. And the shape of the pixel is a hexagon, the surface area of which coincides between the two pixels adjacent in the up-down direction or left-right direction. Further, the pixels adjacent in the up-down direction and the pixels adjacent in the left-right direction are of the same shape while differing in orientation. Then, every other pixel arranged in the up-down direction is of the same shape, and every other pixel arranged in the left-right direction is of the same shape.

Also, in FIG. 5, when the angle formed by the electrode edge of the saw teeth-shaped second electrode 12 and the horizontal direction (longitudinal direction in the diagram) is defined as θ1, this angle θ1 is set to be from greater than 0° to 15° or below. With this arrangement, a structure in which the pixel edges of the sections demarcated by the electrode edges of the respective second electrodes 12 of the respective pixels and directions 13, 14 of the respective orientation processes do not perpendicularly intersect is realized. Further, all of the bending points 21 of the respective second electrodes 12 are disposed overlapping while offset to the left or right from the center portion in the width direction of the first electrode 11, thereby making it possible to further homogenize the orientation state of the liquid crystal layer compared to the electrode structures shown in FIG. 2 and FIG. 3 described above, that is, compared to a case where the respective bending points 21 are disposed overlapping at the center portion. Specifically, with regard to the electrode edges of the respective pixels, given length components c, d parallel to the left-right direction as shown in the diagram, the total length of c and d and the electrode widths of the respective first electrodes 11 are set substantially equal. At this time, the respective bending portions 21 are disposed on the right side as viewed from the center of the pixels in the diagram in a case where the relationship at the electrode edge on the upper side in the diagram is set to c>d, and on the left side as viewed from the center of the pixels in the diagram in a case where the relationship at the electrode edge on the lower side in the diagram is set to c>d. In this example as well, c is preferably set within the range of 1.5-5, that is, c:d is preferably set to 1.5-5:1 when d is set to 1. At this time, while the ratio of c to d at the electrode edge on the upper side in the diagram does not necessarily have to equal the ratio of c to d at the electrode edge on the lower side in the diagram in the respective pixels, making the ratios equal makes the planar view shape of the respective pixels seemingly closer to that of a rectangle and is thus preferred.

Figure 6:
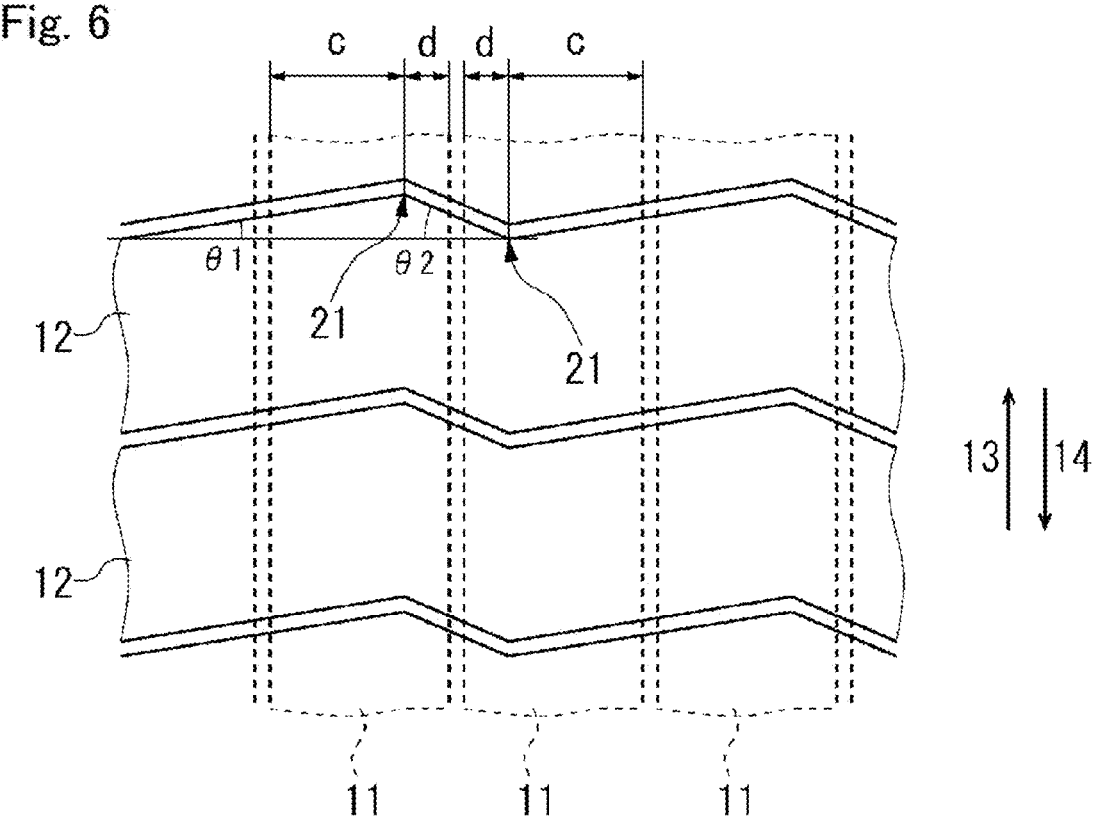
FIG. 6 is a schematic plan view showing other example of the electrode structure.

FIG. 6 is a schematic plan view showing other example of the electrode structure. As shown in FIG. 6, the electrode edge of the respective second electrodes 12 extending in the longitudinal direction in the diagram is formed in a saw teeth shape, and one pitch of the saw teeth basically coincides with the electrode width of the respective first electrodes 11. Further, as shown in FIG. 6, the respective second electrodes 12 are disposed with the bending point (apex angle portion) 21, which is the change point where the lines interconnect, overlapping with the first electrode 11 at a position biased toward the side near the left or right electrode edge from the center portion in the width direction of the first electrode 11. In this example, the respective bending points 21 of the one electrode edge and the other electrode edge of the respective second electrodes 12 are in positions that result in the bending points 21 that overlap with the one first electrode 11 being substantially in alignment in the up-down direction in the diagram. Further, the bending points 21 in these aligned positions are disposed so as to form either a combination in which both are upwardly convex or a combination in which both are downwardly convex.

Hence, since each of the regions where the respective first electrodes 11 and the respective second electrodes 12 intersect constitutes one pixel, the outer edge shape (planar view shape) of the respective pixels is demarcated by electrode edges of the first electrode 11 and electrode edges of the second electrode 12. And the shape of the pixel is a hexagon, the shape of which coincides between the two pixels adjacent in the up-down direction. Further, the pixels adjacent in the left-right direction are of the same shape and surface area while differing in orientation. Then, every other pixel arranged in the left-right direction is of the same shape.

In FIG. 6, when the angles formed by the electrode edge of the second electrode 12 with respect to the horizontal direction (the left-right direction in the diagram) are respectively defined as θ1, θ2, the relationship is θ1<θ2 and the angle θ1 is set to a value greater than 0° and less than or equal to 15°. With this arrangement, a structure in which the pixel edges of the sections demarcated by the electrode edges of the respective second electrodes 12 of the respective pixels and directions 13, 14 of the respective orientation processes do not perpendicularly intersect is realized. Further, all of the bending points 21 of the respective second electrodes 12 are disposed overlapping while offset to the left or right from the center portion in the width direction of the first electrode 11, thereby making it possible to further homogenize the orientation state of the liquid crystal layer compared to the electrode structures shown in FIG. 2 and FIG. 3 described above, that is, compared to a case where the respective bending points 21 are disposed overlapping at the center portion. Specifically, with regard to the electrode edges of the respective pixels, given length components c, d (c>d in this example) parallel to the left-right direction as shown in the diagram, the total length of c and d and the electrode widths of the respective first electrodes 11 are set substantially equal. In this example, c is preferably set within the range of 1.5-5, that is, c:d is preferably set to 1.5-5:1 when d is set to 1.

Figure 7:
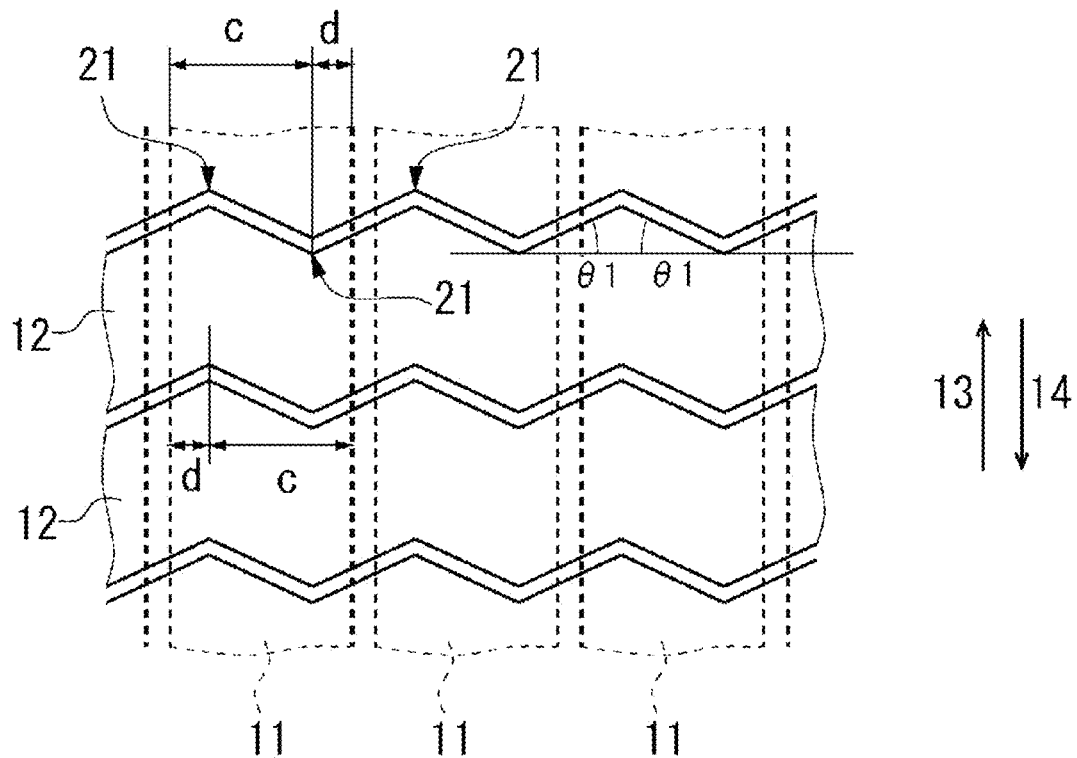
FIG. 7 is a schematic plan view showing other example of the electrode structure.

FIG. 7 is a schematic plan view showing other example of the electrode structure. As shown in FIG. 7, the electrode edge of the respective second electrodes 12 extending in the longitudinal direction in the diagram is formed in a saw teeth shape, and two pitches of the saw teeth basically coincides with the electrode width of the respective first electrodes 11. As shown in FIG. 7, the respective second electrodes 12 are disposed with the bending points (apex angle portions) 21, which are the change points where the lines interconnect, overlapping with the first electrode 11; specifically, the respective second electrodes 12 are disposed with two of the bending points 21 of the upper side electrode edge and two of the bending points 21 of the lower side electrode edges overlapping with the respective first electrodes 11. In this example, the respective bending points 21 of the one electrode edge and the other electrode edge of the respective second electrodes 12 are in positions that result in the bending points 21 that overlap with the one first electrode 11 being substantially in alignment in the up-down direction in the diagram. Further, the bending points 21 in these aligned positions are disposed comprising a combination in which both are upwardly convex (left side of pixel) and a combination in which both are downwardly convex (right side of pixel).

Hence, since each of the regions where the respective first electrodes 11 and the respective second electrodes 12 intersect constitutes one pixel, the outer edge shape (planar view shape) of the respective pixels is demarcated by electrode edges of the first electrode 11 and electrode edges of the second electrode 12. And the shape of the pixel is a hexagon, the shape and the surface area of which coincides between the two pixels adjacent in the up-down direction and left-right direction.

Also, in FIG. 7, when the angle formed by the electrode edge of the saw teeth-shaped second electrode 12 and the horizontal direction (longitudinal direction in the diagram) is defined as θ1, this angle θ1 is set to be from greater than 0° to 15° or below. With this arrangement, a structure in which the pixel edges of the sections demarcated by the electrode edges of the respective second electrodes 12 of the respective pixels and directions 13, 14 of the respective orientation processes do not perpendicularly intersect is realized. Further, all of the bending points 21 of the respective second electrodes 12 are disposed overlapping while offset to the left or right from the center portion in the width direction of the first electrode 11, thereby making it possible to further homogenize the orientation state of the liquid crystal layer compared to the electrode structures shown in FIG. 2 and FIG. 3 described above, that is, compared to a case where the respective bending points 21 are disposed overlapping at the center portion. At this time, while the ratio of c to d at the electrode edge on the upper side in the diagram does not necessarily have to equal the ratio of c to d at the electrode edge on the lower side in the diagram in the respective pixels, making the ratios equal makes the planar view shape of the respective pixels seemingly closer to that of a rectangle and is thus preferred.

Figure 8:
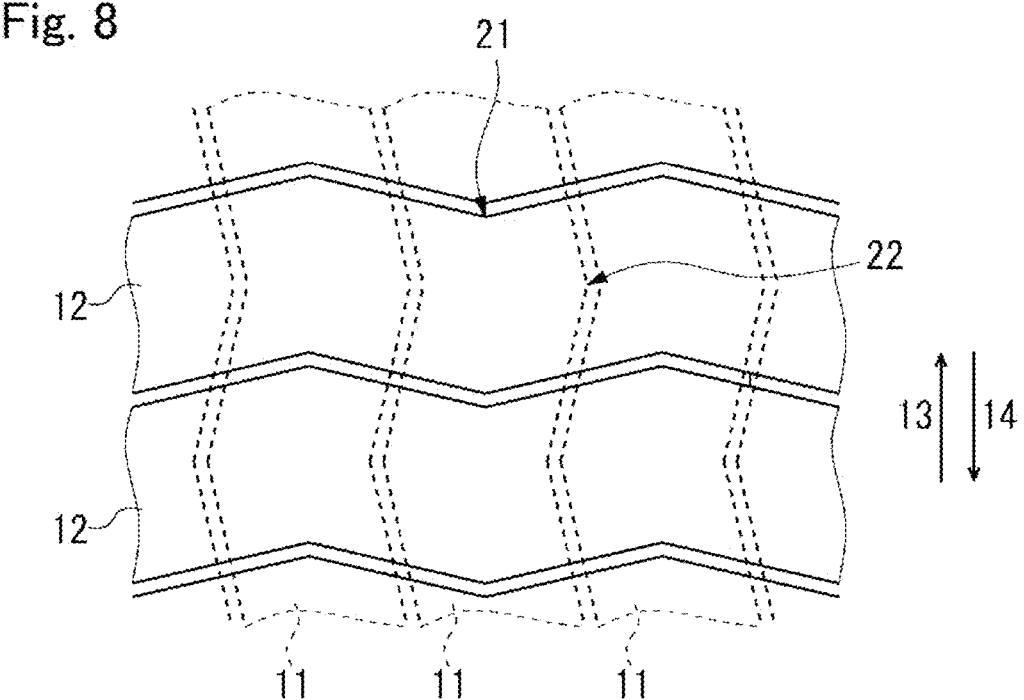
FIG. 8 is a schematic plan view showing an example of a modified electrode structure.

Note that while the electrode edge of only the second electrode 12 is bent in each of the embodiments described above, the electrode edge of the first electrode 11 may be bent as well. FIG. 8 is a diagram showing a schematic plan view that shows an example of an electrode structure in this case. As shown in FIG. 8, the electrode edges of the respective second electrodes 12 extending in the left-right direction in the diagram are formed in a saw tooth shape, and furthermore the electrode edges of the respective first electrodes 11 extending in the up-down direction in the diagram are also formed in a saw tooth shape. Also, as shown in FIG. 8, the respective second electrodes 12 are disposed in a state in which the bending points (apex angle portions) 21, which are the change points where the lines interconnect, overlap with the center portion in the width direction of the first electrode 11. Similarly, the respective first electrodes 11 are disposed in a state in which the bending points (apex angle portions) 22, which are the change points where the lines interconnect, overlap with the center portion in the width direction of the second electrode 12. Note that the arrangement of the respective bending points 21, 22 is not limited thereto, and various types such as those shown in FIGS. 3-7 described above can be considered.

EXECUTION EXAMPLES

A segment electrode substrate and a common electrode substrate were fabricated by preparing a glass substrate on which an ITO film was formed after polishing one surface thereof and applying an $SiO_2$ undercoat to that surface, and forming the ITO film into a preferred electrode pattern on the glass substrate by a photolithography process and an etching process. Note that an insulating layer made of $SiO_2$ or the like may also be formed on a part of the surface of the electrode as needed.

The segment electrode substrate and the common electrode substrate were then washed with an alkaline solution, purified water, or the like, a vertical alignment film was subsequently applied to the respective substrates using the flexographic printing method, and the substrates were heated in a clean oven for 90 minutes at 200° C. Subsequently, a cotton rubbing cloth was used to perform the rubbing process on the both substrates in one direction within the substrate surface. Note that the rubbing process may also be performed on either one of the substrates only.

A thermo-curing type sealing material mixed with glass spacers of an approximate 5-μm rod-shape was applied to the common electrode substrate in a frame-like shape using a screen-printing method. Further, plastic spacers approximately 4.9 μm in size were sprayed and disposed in the segment electrode substrate using a dry-spraying method. Subsequently, both substrates were affixed to each other so that the electrode surfaces thereof faced each other and the rubbing directions were anti-parallel. The sealing material was then cured by thermo-compression bonding, thereby completing the fabrication of an empty cell. Note that the above described empty cell was fabricated using a multiple mother glass substrate, and one empty cell was obtained via a scribe and break process.

Next, a liquid crystal material with a refractive index anisotropy $\Delta n$ of approximately 0.18 and a dielectric anisotropy $\Delta \in <0$ was injected into the empty cell using a vacuum injection method. Next, pressing was performed to obtain a more uniform cell thickness, and an ultraviolet curing resin was applied. Subsequently, the cell was maintained with the pressing pressure slightly weakened for approximately several minutes to suction the liquid crystal material from the injection port into the interior, curing was subsequently performed by irradiating ultraviolet rays to seal the port, and the product was baked for one hour at 120° C.

Subsequently, a beveling process of the lead-out electrode terminals or the like was executed, washing was performed, polarizing plates were affixed by a laminator so that a crossed Nicol alignment was substantially formed on the front surface and the rear surface of the cells, and then the air bubbles between the polarizing plate adhesive layer and the glass substrate were removed while heating the product inside a vacuum chamber. Note that the pretilt angle measured using the crystal rotation method prior to affixing the polarizing plates was roughly 89.85°±0.08°.

In the lead-out terminal area, a flexible film was connected to the driver IC input/output terminals via an anisotropic conductive film by a process where a driver IC was thermo-compressed via the anisotropic conductive film, establishing the terminals as terminals that connect to an external controller.

Note that the segment electrode extends in the up-down direction (12 o'clock and 6 o'clock directions) of the liquid crystal display apparatus, and the longitudinal direction of the common electrode extends in the left-right direction (9 o'clock and 3 o'clock directions), and thus the two substantially perpendicularly intersect. Further, the rubbing direction was set to the 6 o'clock direction for the rear substrate and to the 12 o'clock direction for the front substrate, the orientation direction of the liquid crystal molecules at the center in the layer thickness direction of the liquid crystal layer was set to the 6 o'clock direction, and the optimal viewing direction was set to the 12 o'clock direction. Further, in the respective liquid crystal display apparatuses shown as execution examples and a comparison example below, the pixel dimensions are 410 μm long and 410 μm wide, the distance between pixels is 20 nm, the number of segment electrodes is 240, and the number of common electrodes is 76. Further, for the multiplex driving of the respective liquid crystal display apparatuses of the execution examples and comparison example, the multiline selection addressing method (MLS method) indicated in Japanese Patent Laid-Open No. Hei 06-27907 of the patent documents was used, for example. Specifically, the duty was set to 1/76, the bias was set to 1/10, and the number of simultaneous line selections was set to 4 (28-line inversion). The setup method of the driving voltage VLCD and the frame frequency will be indicated in the following explanation.

Figure 9A:
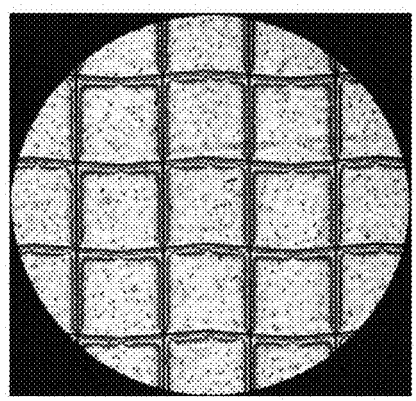
FIG. 9A is a diagram showing the aligned texture during the bright display state of the liquid crystal display apparatus of an execution example.

FIG. 9A is a diagram showing the aligned texture during the bright display state of the liquid crystal display apparatus of an execution example. Note that the structure shown in FIG. 2 described above was utilized as the electrode structure, and θ1 was set to approximately 5°. Further, the driving voltage VLCD was set to 20.5 V, and the frame frequency was set to 271 Hz. In FIG. 9A, on observing the dark regions of the upper side edge of the respective pixels, it was found that only one intersecting point of the two dark lines existed, and the position was fixed near the bending point. The shapes of the dark lines are also the same. Note, however, that while the positions of the intersecting points and the shapes of the dark lines differ within the two pixels adjacent in the left-right direction due to the differing pixel structures, the intersecting points in both pixels were found to be disposed in fixed positions near the bending point. Further, it was confirmed that a decrease in display uniformity caused by poor orientation does not occur even when the liquid crystal display apparatus of this execution example was driven at a frame frequency of 271 Hz in a 70° C. environment.

Figure 9B:
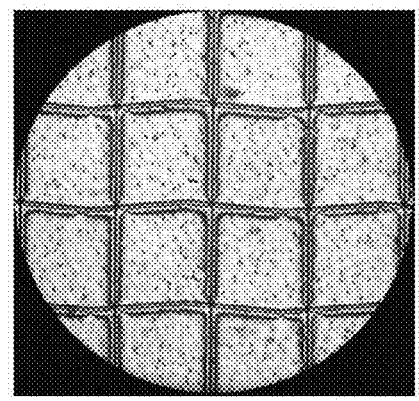
FIG. 9B is a diagram showing the aligned texture during the bright display state of the liquid crystal display apparatus of another execution example.

FIG. 9B is a diagram showing the aligned texture during the bright display state of the liquid crystal display apparatus of another execution example. Note that the structure shown in FIG. 4 described above was utilized as the electrode structure, and θ1 was set to approximately 5° and c:d was set to 3:1. Further, the driving voltage VLCD was set to 20.5 V, and the frame frequency was set to 271 Hz. In FIG. 9B, on observing the dark regions of the upper side edge of the respective pixels, the dark lines produced near the upper side edge of the pixel and the intersecting point thereof were found to be disposed in a fixed position near the bending point in the same manner as the case of FIG. 9A. While the fixed positions of the intersecting points and the like differ for adjacent left and right pixels, the fixed positions of the intersecting points were found to be substantially equal if the pixel shapes were alike. Further, it was confirmed that a decrease in display uniformity caused by poor orientation does not occur even when the liquid crystal display apparatus of this execution example was driven at a frame frequency of 271 Hz in a 80° C. environment.

Figure 9C:
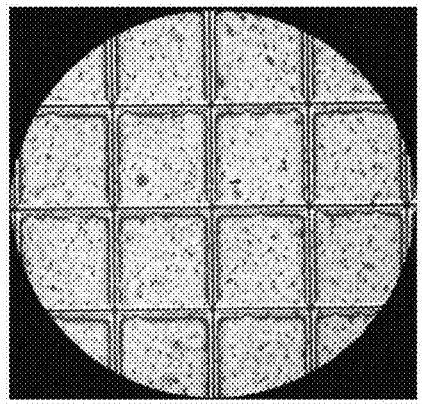
FIG. 9C is a diagram showing the aligned texture during the bright display state of the liquid crystal display apparatus of a comparison example.

FIG. 9C is a diagram showing the aligned texture during the bright display state of the liquid crystal display apparatus of a comparison example. Note that the comparison example here is a liquid crystal display apparatus comprising the same structure as that of the execution examples described above, other than both the first electrode and the second electrode were formed into stripe shapes, and both were disposed perpendicularly intersecting each other. As shown in FIG. 9C, dark regions were observed near the three side edges of the pixel and, on observing the dark regions of the upper side edge, two dark lines were observed, and an odd number of points where the two intersect exist. However, the position where the intersecting point exists was found to differ by pixel. Such a difference in the number of intersecting points, shape, and the like per pixel is presumably the cause of the occurrence of poor orientation.

Note that this invention is not limited to the subject matter of the foregoing embodiments, and can be implemented by being variously modified within the scope of the gist of the present invention. For example, while the electrode edges of both sides of the second electrode were formed into polygonal line shapes in the embodiments described above, only the electrode edge of one side may be formed into a polygonal line shape. In such a case, the obliquely crossing line segments are preferably disposed on the side opposite the viewing side of the pixel edge.

Figure 10:
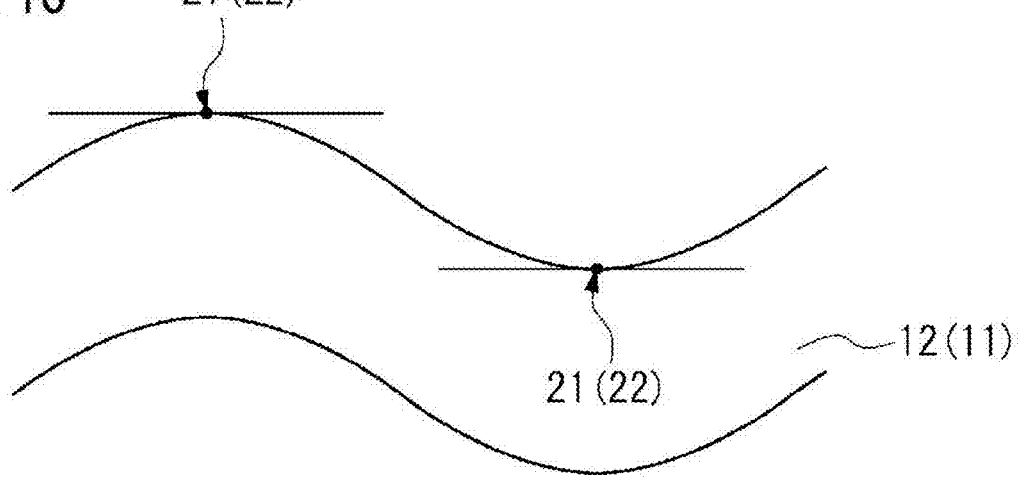
FIG. 10 is a schematic plan view showing a modified configuration of the electrode edges.

Further, while the respective embodiments and execution examples described above indicate cases where the electrode edges of the second electrode (or first electrode) are polygonal line shapes formed by the connection of a plurality of lines, and describe cases where the bending point, which is the intersection point where these lines connect, overlaps with the other electrode, the change point of the electrode edge is not limited to such a bending point. For example, in a case where the electrode edges of the second electrode 12 (or the first electrode 11) are of a shape where a plurality of curves connect as shown in FIG. 10, the point where this curve takes on an extreme value (maximum value or minimum value), that is, the intersection point where a plurality of the curves connect, may be set as the change point 21 (or 22). Furthermore, this curve may be an approximated polygon edge formed by connecting a large number of minute lines.

What is claimed is:

1. A liquid crystal display apparatus, comprising:
   a first substrate and a second substrate placed opposite each other,
   a first electrode which is provided on one surface of the first substrate and which extends in a first direction,
   a second electrode which is provided on one surface of the second substrate and which extends in a second direction that intersects with the first direction; and
   a mono-domain vertical alignment type liquid crystal layer with a pretilt angle of less than 90°, provided between said one surface of the first substrate and said one surface of the second substrate,
   wherein a pixel is configured in a region where the first electrode and the second electrode intersect,
   wherein an orientation process is performed in a direction perpendicular to the second direction on at least one of the first substrate and the second substrate,
   wherein an electrode edge of at least one side of the second electrode is of a shape that includes lines or curves that are obliquely crossed relative to the first direction and periodically bend back,
   wherein pixel edges of the pixel are demarcated, including the lines or curves that are obliquely crossed, and
   wherein all change points, each of which is defined as a point where a line or curve among the lines or curves of the electrode edge of the second electrode intersects with another line or curve which is among the lines or curves of the electrode edge of the second electrode and which has a different angle, are disposed so that they are superimposed in planar view with the first electrode.

2. The liquid crystal display apparatus according to claim 1, wherein each change point is disposed at a center between electrode edges of both sides of the first electrode.

3. The liquid crystal display apparatus according to claim 1, wherein each change point is disposed so that it is biased toward a side near an electrode edge of either side of the first electrode.

4. The liquid crystal display apparatus according to claim 1, wherein the obliquely crossing lines are disposed at an angle greater than 0° and less than or equal to 15° using the second direction as standard.

* * * * *